(12) United States Patent
Eyerly

(10) Patent No.: US 6,508,438 B2
(45) Date of Patent: Jan. 21, 2003

(54) SPACECRAFT ORBIT CONTROL USING ORBIT POSITION FEEDBACK

(75) Inventor: Bruce N. Eyerly, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/921,737

(22) Filed: Aug. 3, 2001

(65) Prior Publication Data

US 2002/0020785 A1 Feb. 21, 2002

Related U.S. Application Data

(63) Continuation-in-part of application No. 09/374,215, filed on Aug. 13, 1999, now abandoned.

(51) Int. Cl.[7] .................................................. B64G 1/00
(52) U.S. Cl. ....................................................... 244/164
(58) Field of Search ............................. 244/158 R, 164, 244/171, 161; 701/13

(56) References Cited

U.S. PATENT DOCUMENTS

| | | | | |
|---|---|---|---|---|
| 4,958,788 A | * | 9/1990 | Namera et al. | 244/169 |
| 5,058,835 A | * | 10/1991 | Goodzeit et al. | 244/165 |
| 5,108,050 A | * | 4/1992 | Maute | 244/164 |
| 5,109,345 A | * | 4/1992 | Dabney et al. | 244/161 |
| 5,130,931 A | * | 7/1992 | Paluszek et al. | 244/164 |
| 5,140,525 A | * | 8/1992 | Shankar et al. | 244/164 |
| 5,222,023 A | * | 6/1993 | Liu et al. | 244/170 |
| 5,431,010 A | * | 7/1995 | Stone | 239/102.2 |
| 5,459,669 A | * | 10/1995 | Adsit et al. | 244/169 |
| 5,528,502 A | * | 6/1996 | Wertz | 244/158 R |
| 5,556,058 A | * | 9/1996 | Bender | 244/164 |
| 5,692,707 A | * | 12/1997 | Smay | 244/165 |
| 5,788,189 A | * | 8/1998 | Iida | 244/166 |
| 5,791,598 A | * | 8/1998 | Rodden et al. | 244/165 |
| 5,806,804 A | * | 9/1998 | Goodzeit et al. | 244/169 |
| 5,957,410 A | * | 9/1999 | Bruederle et al. | 244/164 |
| 6,012,000 A | * | 1/2000 | Holmes et al. | 244/171 |
| 6,032,903 A | * | 3/2000 | Fowell et al. | 244/164 |
| 6,053,455 A | * | 4/2000 | Price et al. | 244/169 |
| 6,089,507 A | * | 7/2000 | Parvez et al. | 244/158 R |
| 6,102,337 A | * | 8/2000 | Quartararo | 244/169 |
| 6,116,543 A | * | 9/2000 | Koppel | 244/158 R |
| 6,135,393 A | * | 10/2000 | Sackheim et al. | 244/169 |

* cited by examiner

Primary Examiner—Peter M. Poon
Assistant Examiner—Kevin Jakel

(57) ABSTRACT

A spacecraft orbit control system and method for controlling the orbit of a spacecraft during orbit raising includes processing spacecraft position data to meet the spacecraft attitude sensing needs for long duration, low thrust orbit raising burns. The actual spacecraft position as determined by a global positioning system (GPS) receiver is compared with the desired spacecraft position to generate an error signal indicative of a spacecraft position error for adjusting the attitude of the spacecraft as thrusters move the spacecraft. The attitude of the spacecraft is adjusted to eliminate the spacecraft position error such that the actual spacecraft position corresponds with the desired spacecraft position and the spacecraft maintains a desired orbit during the orbit raising.

20 Claims, 2 Drawing Sheets

SPACECRAFT ORBIT CONTROL USING ORBIT POSITION FEEDBACK

CROSS REFERENCE TO RELATED APPLICATIONS

The present invention is a continuation-in-part to U.S. patent application Ser. No. 09/374,215 filed Aug. 13, 1999 now abandoned entitled "Spacecraft Orbit Control using Orbit Position Feedback" filed simultaneously herewith and incorporated by reference herein.

TECHNICAL FIELD

The present invention relates generally to spacecraft orbit control systems and methods and, more particularly, to a spacecraft orbit control system and method which process spacecraft position data to meet the spacecraft attitude sensing needs for long duration, low thrust orbit raising burns.

BACKGROUND ART

Traditional spacecraft orbit raising maneuvers employ high thrust thrusters burning for short durations. Precise spacecraft attitude and orbit information is vital to ensure obtaining the desired change in spacecraft orbit and the efficient use of the high thrust thrusters. While attitude can be maintained during the burn, the orbital trajectory is essentially open loop. Unfortunately, the attitude determination sensors on board the spacecraft often do not work during orbit raising for such reasons as the spacecraft being too close to earth, a spinning transfer orbit, obscured line of sight due to stowed configuration of the spacecraft, etc. Alternatively, on some occasions, the required attitude accuracy during the orbit raising exceeds that needed on-station. In either case, the orbit raising sensor requirements add to the cost and complexity of the attitude determination system, often requiring dedicated sensors and sensor processing.

Ideally, what is needed is a spacecraft orbit control system and method for spacecraft orbit raising in which the absolute attitude determination accuracy requirements are dramatically relaxed relative to traditional spacecraft orbit raising techniques.

SUMMARY OF THE INVENTION

The foregoing and other advantages are provided by a method and apparatus for a spacecraft orbit control system and method which process spacecraft position data to meet the spacecraft attitude sensing needs for long duration, low thrust orbit raising burns. A control system for controlling the orbit of a spacecraft during orbit raising is provided. The control system includes an actual spacecraft position sensor that generates an actual position signal. A trajectory provider that includes an orbital determination provider, a memory, a first comparator, and a trajectory calculator is also included in the control system. The orbital determination provider generates an orbital model. The memory contains information of a desired orbit. The first comparator generates an orbital error signal in response to the desired orbit and the orbital model. The trajectory calculator determines a trajectory in response to the orbital error signal. A desired spacecraft position provider generates a desired position signal, which represents a desired position along the trajectory. The second comparator generates a positional error signal in response to the actual position signal and said desired position signal. A spacecraft attitude control system adjusts attitude of the spacecraft in response to the positional error signal.

Accordingly, it is an advantage of the present invention to provide a spacecraft orbit control system and method which processes spacecraft position data to meet the spacecraft attitude sensing needs for long duration, low thrust orbit raising burns.

Another advantage of the present invention to provide a spacecraft orbit control system and method in which the actual spacecraft position is compared with the desired spacecraft position during long duration, low thrust orbit raising burns to generate an error signal indicative of a spacecraft position error for adjusting the attitude of the spacecraft and eliminating the spacecraft position error such that the actual spacecraft position corresponds with the desired spacecraft position.

Furthermore, another advantage of the present invention is that it provides a spacecraft orbit control system and method for controlling the orbit raising of a spacecraft during long duration, low thrust orbit raising burns by closing an actual spacecraft position sensing loop around the desired spacecraft position such that spacecraft attitude is within the closed position loop and, hence, relatively low accuracy spacecraft attitude sensing yields acceptable orbit raising performance.

The advantages accruing to the present invention are numerous. For instance, the present invention is a cost effective alternative when using long duration burns with low thrust thrusters augmented by a periodic spacecraft position measurement. Because the spacecraft attitude is inside the closed position loop and is adjusted as necessary to keep the trajectory of the spacecraft on track, the absolute spacecraft attitude determination accuracy requirements are relaxed relative to the prior art.

These and other features, aspects, and embodiments of the present invention will become better understood with regard to the following description, appended claims, and accompanying drawings.

BRIEF DESCRIPTION DRAWINGS

BEST MODE FOR CARRYING OUT THE INVENTION

Figure 1:
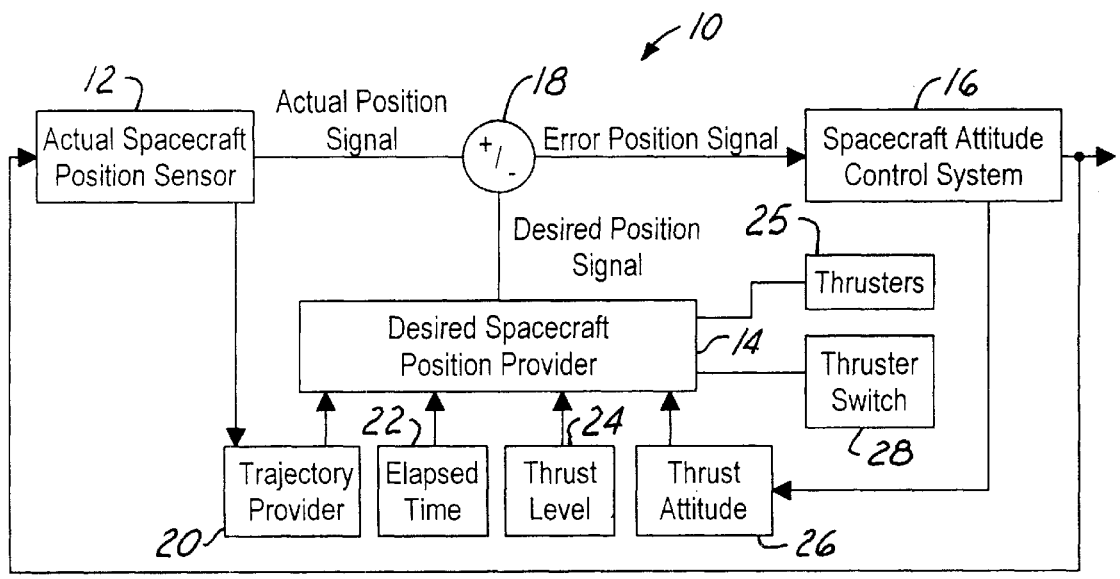
FIG. 1 is a block diagram illustrating the spacecraft orbit control system of the present invention.

Referring now to FIG. 1, a spacecraft orbit control system 10 of the present invention is illustrated. Spacecraft orbit control system 10 is contained on the spacecraft and includes an actual spacecraft position sensor 12, a desired spacecraft position provider 14, and a spacecraft attitude control system 16. Preferably, spacecraft orbit control system 10 controls the position of the spacecraft during orbit raising in which long duration, low thrust thrusters move the spacecraft. During the orbit raising, actual position sensor 12 generates an actual position signal indicative of the actual position of the spacecraft. The position of the spacecraft refers to the position of the spacecraft with respect to the earth. Desired position provider 14 provides a desired position signal indicative of the desired position of the spacecraft. The desired position of the spacecraft is the planned position of the spacecraft along a desired orbit at a given time. The orbit of a spacecraft is the path followed by the spacecraft as it revolves around the earth. Successive determinations of position lead to a determination of spacecraft velocity and orbit.

A first comparator 18 of spacecraft orbit control system 10 compares the actual position signal from actual position sensor 12 and the desired position signal from desired position provider 14 to generate a position error signal. The position error signal is indicative of the difference in the spacecraft position between the actual position and the desired position of the spacecraft. Spacecraft attitude control system 16 uses the position error signal for controlling the attitude, and consequently the position and orbit, of the spacecraft. The attitude of the spacecraft is the angular orientation of the spacecraft with respect to a frame of reference such as the earth or fixed stars. In general, the attitude of the spacecraft refers to where the spacecraft is pointed and the position of the spacecraft refers to where the spacecraft is located.

Actual position sensor 12 is a navigation device, which generates data indicative of the actual position of the spacecraft. Preferably, actual position sensor 12 is a global positioning system (GPS) receiver or other suitable means such as radio frequency ranging for determining the actual position of the spacecraft. Unlike prior art on-station attitude determination sensors that provide precise attitude information, actual position sensor 12 provides actual position information that is processed by spacecraft orbit control system 10 along with desired position information to determine relatively low precision attitude information.

Desired position provider 14 generates the desired position signal as a function of a desired trajectory form a trajectory provider 20, an elapsed time input 22, a thrust level input 24, and a thrust attitude input 26. The trajectory provider 20 provides a signal indicative of the desired orbit of the spacecraft. The desired orbit is usually selected prior to launching of the spacecraft and is stored in a memory. Elapsed time input 22 provides a signal indicative of the given time that the spacecraft is in orbit. Thrust level input 24 provides a signal indicative of the magnitude of the thrust exerted by thrusters 25 contained on the spacecraft. Thrust attitude input 26 provides a signal indicative of the direction in which the thrusters are oriented. The thrusters 25 may also be switched "ON" and "OFF" by thruster switch 28. The thrusters 25 may operate at a constant power while switch 28 is continuously switched on and off until the spacecraft is properly positioned and oriented.

Spacecraft attitude control system 16 includes thrusters, which preferably operate at long duration, low thrust orbit raising burns. The thrusters 25 are oriented at a given attitude and provide a given level of thrust to move the spacecraft in a given direction with a given velocity. Because the orbit raising burns are of low thrust, it is not critical to precisely know the attitude of the spacecraft. A movement of the spacecraft in the wrong direction is not critical during long duration, low thrust raising burns because the spacecraft moves slightly in the wrong direction as compared to short duration, high thrust raising burns in which an error in the wrong direction will cause the spacecraft to greatly overshoot its intended target. Preferably, the thrusters 25 are ion propulsion thrusters or the like. Spacecraft attitude control system 16 may provide a feedback signal to actual spacecraft position sensor 12. The feedback signal from spacecraft attitude control system 16 is an attitude signal, which is converted to a position signal by a conversion unit (not specifically shown).

Figure 2:
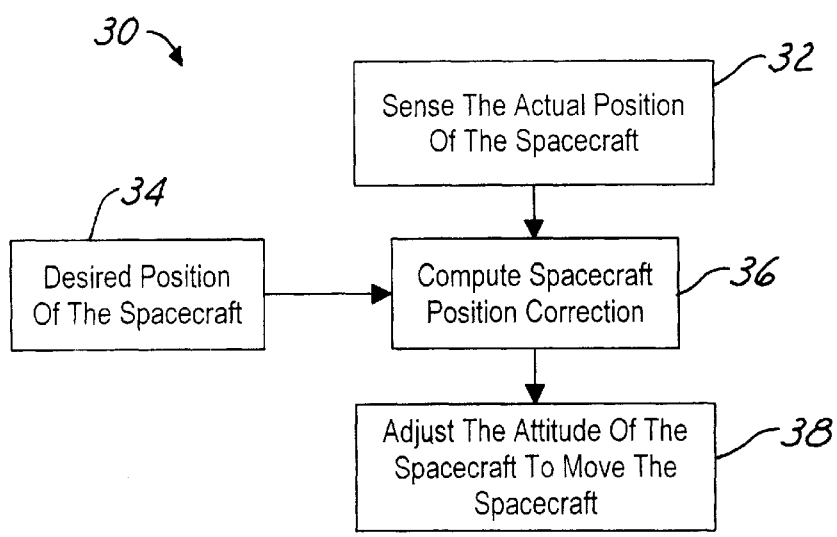
FIG. 2 is a flow diagram illustrating the processes associated with the spacecraft orbit control system and method of the present invention.

Referring now to FIG. 2, a flow diagram 30 illustrating the processes associated with the spacecraft orbit control system and method of the present invention is shown. In general, the processes shown in flow diagram 30 control the orbit raising of the spacecraft during long duration, low thrust orbit raising burns. Block 32 senses the actual position of the spacecraft during the orbit raising and generates an actual position signal indicative of the actual position of the spacecraft. Block 34 determines the desired position of the spacecraft during the orbit raising and provides a desired position signal indicative of the desired position of the spacecraft. Block 36 compares the actual position signal with the desired position signal to generate an error signal indicative of a difference in position between the actual position and the desired position of the spacecraft. Block 38 adjusts the attitude of the spacecraft to move the spacecraft from the actual position to the desired position along the intended trajectory as a function of the error signal such that the spacecraft maintains a desired orbit during the orbit raising.

The spacecraft orbit control system and method described above assumes the thruster orientation is fixed with respect to the spacecraft body. Often, spacecraft employ thrusters, which can be reoriented (i.e. gimbaled thrusters) relative to the spacecraft body. In this alternate embodiment the spacecraft attitude may not need to be adjusted to correct for orbital errors. Only the thruster orientation, relative to the spacecraft body, needs to be adjusted. Hence, spacecraft attitude control system 16 would adjust the thruster orientation and this change in orientation would be indicated by thrust attitude input 26.

Figure 3:
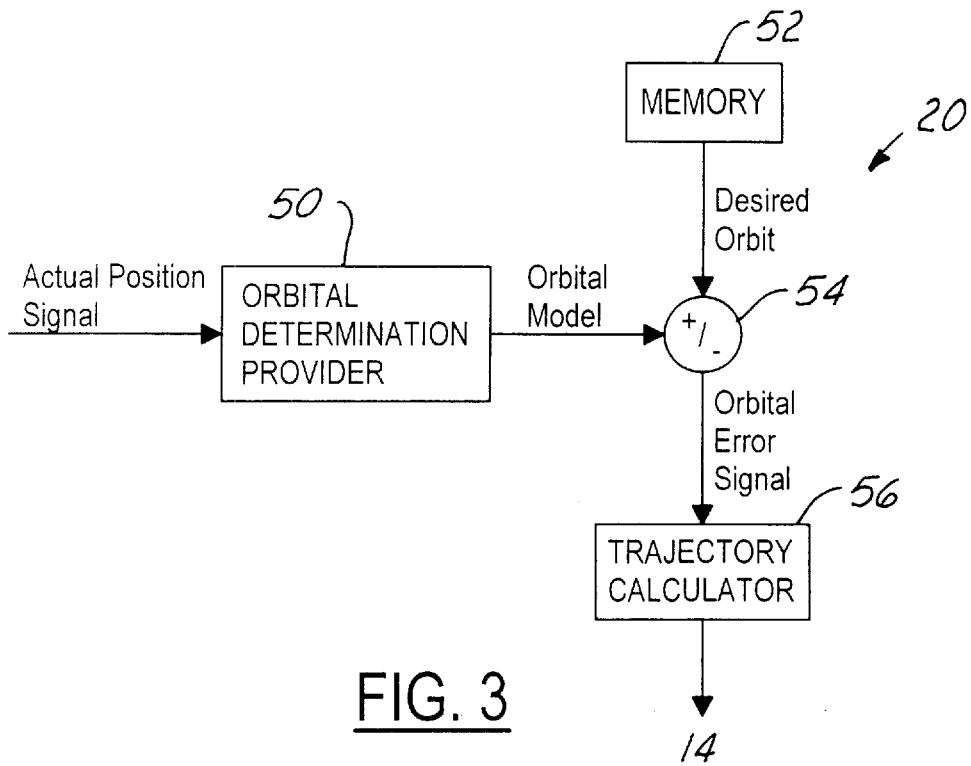
FIG. 3 is a block diagram illustrating internal componentry of a trajectory provider of the present invention.

Referring now to FIG. 3, a block diagram illustrating internal componentry of the trajectory provider 20 of the present invention is shown. The trajectory provider includes an orbital determination provider 50, which determines an orbital model of the spacecraft in a current orbit in response to the actual position signal. The orbital model represents the spacecraft current position in the current orbit and its position and orientation relative to an earth station. The trajectory provider also includes a memory 52 for storing information of a desired orbit, and a second comparator 54. The comparator 54 compares the orbital model to the desired orbit and generates an orbital error signal. The orbital error signal is transferred to a trajectory calculator 56, which calculates a desired trajectory. The trajectory represents a vector of travel the spacecraft should travel along in order to position itself in the desired orbit and in the desired position.

Typically, necessary maneuvers as to properly position the spacecraft in a proper orbit are determined by ground based calculations and executed with a series of specific orientation and thruster burn commands that are transmitted to the spacecraft. The current invention allows all the calculation and maneuvers to be determined and executed directly on the spacecraft.

Figure 4:
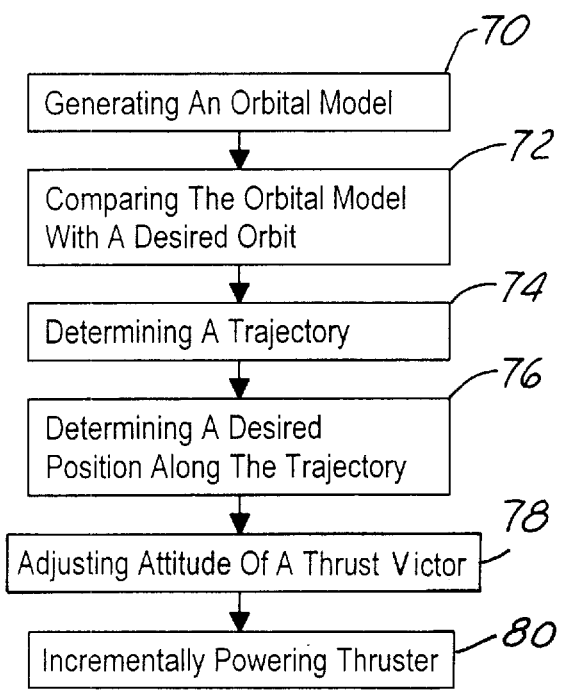
FIG. 4 is a flow chart illustrating a method for controlling the orbit of a spacecraft in accordance with an embodiment of the present invention.

Referring now to FIG. 4, a flow chart illustrating a method for controlling the orbit of a spacecraft in accordance with an embodiment of the present invention is shown.

In step 70, the orbital determination provider as stated above determines the orbital model in response to the actual position signal.

In step 72, the orbital model is compared to the desired orbit to generate an orbital error signal.

In step 74, a trajectory for the spacecraft to travel along is determined in response to the orbital error signal. The trajectory is determined as to minimize maneuvers and fuel consumption.

In step 76, the desired spacecraft position provider 14 determines a desired position along the determined trajectory, also as stated above.

In step 78, the spacecraft attitude control system 16 adjusts the attitude of a thrust vector so as to properly position and orient the spacecraft. The thrust vector represents a direction as to which the thrusters are directing the spacecraft. In adjusting the thrust vector the attitude of the thrusters 25 or the attitude of the spacecraft may be adjusted.

In step 80, the trajectory provider determines the trajectory along with the minimum amount of maneuvers and appropriate times to turn the thrusters 25 "ON" and "OFF". This in turn provides an efficient positioning technique that minimizes on fuel consumption. The desired spacecraft position provider than issues the appropriate commands as to accomplish the positioning along the determined trajectory. Thrusters 25 are powered "ON" and "OFF" at different times depending upon a desired maneuver and the orbital mechanics involved. For example, one orbital positioning technique that may be used is when the spacecraft position provider 14 incrementally powers the thrusters 25 "ON" at apogee and "OFF" at points other than apogee. Apogee represents a point on the spacecraft furthest away from earth, as opposed to perigee that represents a point closest to earth. The thrusters 25 are incrementally powered ON at a constant power and at low thrust levels as to nudge the spacecraft into position. Thereby, raising perigee altitude and allowing the apogee altitude to remain the same. Maintaining the apogee altitude prevents additional maneuvers as known in the art, for this particular example. The aforementioned method is used to conserve on fuel and minimize maneuvers of the spacecraft, thereby saving additional fuel.

The spacecraft orbit control system and method of the present invention is preferably for use during orbit raising for low earth orbit (LEO) satellites. However, the spacecraft control system and method can be generalized to include medium earth orbit (MEO) and geosyncrhonous earth orbit (GEO) satellites. In addition for use with orbit raising, the spacecraft control system and method of the present invention can be generalized to include de-orbit, station keeping, and orbit change maneuvers. Further, the spacecraft control system and method can be extended to a variety of orbit determination techniques and thrust levels.

Thus it is apparent that there has been provided, in accordance with the present invention, a spacecraft orbit control system and method that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A control system for controlling the orbit of a spacecraft during orbit raising, the control system comprising:
   an actual spacecraft position sensor generating an actual position signal;
   a trajectory provider comprising;
      an orbital determination provider generating an orbital model;
      a memory containing information of a desired orbit;
      a second comparator generating an orbital error signal in response to said desired orbit and said orbital model; and
      a trajectory calculator determining a trajectory in response to said orbital error signal;
   a desired spacecraft position provider generating a desired position signal representing a desired position along said trajectory;
   a first comparator generating a positional error signal in response to said actual position signal and said desired position signal; and
   a spacecraft attitude control system adjusting attitude of the spacecraft in response to said positional error signal.

2. A control system as in claim 1 wherein said spacecraft attitude control system adjusts attitude of the spacecraft such that the spacecraft maintains a desired orbit during orbit raising.

3. A control system as in claim 1 wherein said actual spacecraft position sensor contains a global positioning system receiver.

4. A control system as in claim 1 wherein said orbital determination provider determines a current orbit in response to said actual position signal.

5. A control system as in claim 1 wherein said orbital determination provider contains a model of a spacecraft orbit around earth.

6. A control system as in claim 1 further comprising a thruster oriented at a given attitude and providing a given level of thrust to adjust the attitude of the spacecraft.

7. A control system as in claim 6 wherein said thruster is a constant power thruster.

8. A control system as in claim 6 wherein said spacecraft attitude control system controls the attitude of the thruster to adjust the attitude of the spacecraft.

9. A control system as in claim 6 wherein said spacecraft attitude control system controls the thrust level of the thruster to adjust the attitude of the spacecraft.

10. A control system as in claim 6 wherein said thruster is adjusted by receiving a thruster adjustment signal from an earth station.

11. A control system as in claim 1 wherein said trajectory provider receives orbital information from an earth station.

12. A method for controlling the orbit of a spacecraft during orbit raising, the method comprising:
   generating an actual position signal;
   generating an orbital model;
   comparing said orbital model with a desired orbit to generate a orbital error signal;
   determining a trajectory in response to said orbital error signal;
   determining a desired position along said trajectory and generating a desired position signal;
   comparing the actual position signal with the desired position signal to generate a positional error signal; and
   adjusting attitude of the spacecraft in response to said position error signal.

13. A method as in claim 12 wherein generating an actual position signal includes using a global positioning system receiver.

14. A method as in claim 12 wherein adjusting the attitude of the spacecraft includes controlling the attitude of a thruster.

15. A method as in claim 14 wherein adjusting the attitude of the spacecraft comprises powering said thruster at a constant power.

16. A method as in claim 15 wherein adjusting the attitude of the spacecraft comprises:

powering said thruster at a low thrust level; and incrementally powering said thruster until the spacecraft is in a desired position.

17. A method as in claim 12 further comprising determining efficient times to power "ON" thrusters during orbit raising.

18. A method as in claim 12 wherein generating an actual position signal is performed periodically.

19. A control system for controlling the orbit of a low earth orbit (LEO) spacecraft during orbit raising, the spacecraft having a thruster oriented at a given attitude and providing a given level of thrust to move the spacecraft, the control system comprising:

an actual spacecraft position sensor generating an actual position signal;

a trajectory provider comprising;

an orbital determination provider generating an orbital model;

a memory containing information of a desired orbit;

a second comparator generating an orbital error signal in response to said desired orbit and said orbital model; and a trajectory calculator determining a trajectory in response to said orbital error signal;

a desired spacecraft position provider generating a desired position signal representing a desired position along said trajectory;

a first comparator generating an positional error signal in response to said actual position signal and said desired position signal; and a spacecraft attitude control system adjusting attitude of the thruster as to adjust attitude of the spacecraft in response to said positional error signal while maintaining a desired orbit during the orbit raising.

20. A control system as in claim 19 wherein said orbital determination provider contains a model of a spacecraft orbit around earth.

* * * * *